(12) United States Patent  (10) Patent No.: US 11,212,378 B2
Hong  (45) Date of Patent: Dec. 28, 2021

(54) FOLDABLE ELECTRONIC DEVICE

(71) Applicant: Samsung Electronics Co., Ltd., Gyeonggi-do (KR)

(72) Inventor: Eunseok Hong, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/723,350

(22) Filed: Dec. 20, 2019

(65) Prior Publication Data
US 2020/0204666 A1  Jun. 25, 2020

(30) Foreign Application Priority Data
Dec. 21, 2018 (KR) .......................... 10-2018-0167336

(51) Int. Cl.
G09G 5/00 (2006.01)
H04M 1/02 (2006.01)
G06F 1/20 (2006.01)
G06F 1/16 (2006.01)

(52) U.S. Cl.
CPC ........ H04M 1/0268 (2013.01); G06F 1/1652 (2013.01); G06F 1/1681 (2013.01); G06F 1/203 (2013.01); G06F 1/206 (2013.01); H04M 1/0216 (2013.01)

(58) Field of Classification Search
CPC ...................... G06F 1/1652; H01L 2251/5338
See application file for complete search history.

(56) References Cited

U.S. PATENT DOCUMENTS

| 5,910,883 | A | * | 6/1999 | Cipolla | F28D 15/0233 165/104.33 |
| 9,204,565 | B1 | | 12/2015 | Lee et al. | |
| 9,250,733 | B2 | | 2/2016 | Lee et al. | |
| 2010/0051815 | A1 | * | 3/2010 | Lee | B82Y 30/00 250/341.6 |

(Continued)

FOREIGN PATENT DOCUMENTS

| CN | 112349206 | 2/2021 |
| KR | 10-1875855 | 7/2018 |
| KR | 10-2021-0011737 | 2/2021 |

OTHER PUBLICATIONS

International Search Report dated Apr. 21, 2020 issued in counterpart application No. PCT/KR2019/018246, 7 pages.

*Primary Examiner* — Nan-Ying Yang
(74) *Attorney, Agent, or Firm* — The Farrell Law Firm, P.C.

(57) ABSTRACT

A foldable electronic device is provided, which includes a flexible display; a hinge assembly configured to fold and unfold a first area and a second area of the flexible display onto and away from each other; and a heat diffusion member. The hinge assembly includes a first hinge frame attached to a bottom face of the first area via a first adhesive member; a second hinge frame attached to a bottom face of the second area via a second adhesive member; a hinge pivotally connecting the first hinge frame and the second hinge frame to each other; and a hinge housing including a space, which accommodates the hinge, and connecting the first hinge frame and the second hinge frame to each other. At least a partial area of the heat diffusion member may be disposed between the flexible display and the hinge housing, in the space or at a position communicating with the space.

20 Claims, 14 Drawing Sheets

(56) References Cited

U.S. PATENT DOCUMENTS

| | | | |
|---|---|---|---|
| 2013/0092426 A1* | 4/2013 | Wu | C09J 7/385 |
| | | | 174/257 |
| 2014/0328041 A1* | 11/2014 | Rothkopf | H04M 1/0216 |
| | | | 361/807 |
| 2016/0049601 A1 | 2/2016 | Hsieh et al. | |
| 2016/0062412 A1* | 3/2016 | Park | G06F 1/1616 |
| | | | 361/679.27 |
| 2016/0070304 A1 | 3/2016 | Shin et al. | |
| 2017/0177034 A1 | 6/2017 | North et al. | |
| 2018/0164854 A1 | 6/2018 | Wood et al. | |

* cited by examiner

FOLDABLE ELECTRONIC DEVICE

CROSS-REFERENCE TO RELATED APPLICATION(S)

This application is based on and claims priority under 35 U.S.C. § 119 to Korean Patent Application No. 10-2018-0167336, filed on Dec. 21, 2018, in the Korean Intellectual Property Office, the entire disclosure of which is incorporated herein by reference.

BACKGROUND

1. Field

The disclosure relates generally to a foldable electronic device.

2. Description of Related Art

Over time, portable electronic devices, such as smart phones and tablet personal computers (PCs), have become lighter and thinner for ease of portability, and have been developed in various ways for ease of use. In particular, a foldable-type electronic device provides a relatively larger screen than an ordinary bar-type electronic device, but when folded, is reduced in size and more convenient to carry. Such a foldable electronic device is entering into the spotlight as an electronic device that satisfies consumer demand for the above-mentioned features.

In the foldable electronic device, at least two or more plates may be pivotally connected to each other via a hinge to be unfolded or folded, and a display may be disposed on the plates coupled to each other via the hinge. For example, a plurality of physically separated displays may be arranged one on each of the plates.

In recent years, with the development of flexible displays, it has become possible to dispose, on the plates, a flexible display capable of providing a large screen, without being physically disconnected. For example, in a window used to protect the exterior of a display, by replacing an existing glass substrate with a highly flexible, hard, and transparent plastic (e.g., polyimide (PI)) film, it has become possible to apply a flexible display, which is provided with flexibility so as to be foldable/unfoldable, to a foldable electronic device.

In an electronic device using a sophisticated printed circuit board, heat dissipation and cooling have been identified as problems related to the reliability of the electronic device. In particular, due to the high integration of semiconductor devices in printed circuit boards and the miniaturization of electronic devices, the performance of electronic devices has been further improved, but a calorific value per unit area of semiconductor devices tends to increase. Therefore, problems, such as deterioration of operation performance and/or malfunction due to overheating, have become factors that greatly degrade the reliability of electronic devices.

In order to solve these types of problems, a heat diffusion member may be used to efficiently circulate heat using the phase change of a working fluid (e.g., a heat pipe). The heat diffusion member is capable of transferring heat quickly since the working fluid, which is introduced into a vacuum-sealed tube, absorbs heat from a high-temperature portion, vaporizes, moves to a low-temperature portion, condenses, and dissipates heat. Such a heat diffusion member may be arranged to connect, for example, a semiconductor element serving as a heat source and a peripheral metal member, in order to dissipate heat transferred from the heat source into the air through the peripheral metal member.

In a foldable electronic device, a hinge housing that prevents the inflow of foreign matter and has an aesthetically advantageous appearance, may be installed to a portion at which a hinge is connected. Further, because the hinge housing has a structure including an air space therein, there is a demand for utilizing this structural feature as a heat generation control mechanism.

In addition, when opening/closing a foldable electronic device, stress is generated in a portion where the flexible display is folded and is increased due to a sudden temperature change, which may result in a defective phenomenon such as buckling deformation, cracking, or peeling in that portion.

SUMMARY

The disclosure is designed to address at least the problems and/or disadvantages described above and to provide at least the advantages described below.

An aspect of the disclosure is to provide a foldable electronic device including a heat dissipation structure utilizing an inner space of a hinge housing.

Another aspect of the disclosure is to provide a foldable electronic device that controls a sudden temperature change of a flexible display via a heat dissipation structure.

Because a sudden temperature change of the flexible display is controlled via a heat dissipation structure, it is possible to improve space utilization in the foldable electronic device without requiring a separate temperature control structure.

In accordance with an aspect of the disclosure, a foldable electronic device is provided, which includes a flexible display; a hinge assembly configured to fold and unfold a first area and a second area of the flexible display onto and away from each other; and a heat diffusion member. The hinge assembly includes a first hinge frame attached to a bottom face of the first area via a first adhesive member; a second hinge frame attached to a bottom face of the second area via a second adhesive member; a hinge pivotally connecting the first hinge frame and the second hinge frame to each other; and a hinge housing including a space, which accommodates the hinge, and connecting the first hinge frame and the second hinge frame to each other. At least a partial area of the heat diffusion member may be disposed between the flexible display and the hinge housing, in the space or at a position communicating with the space.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
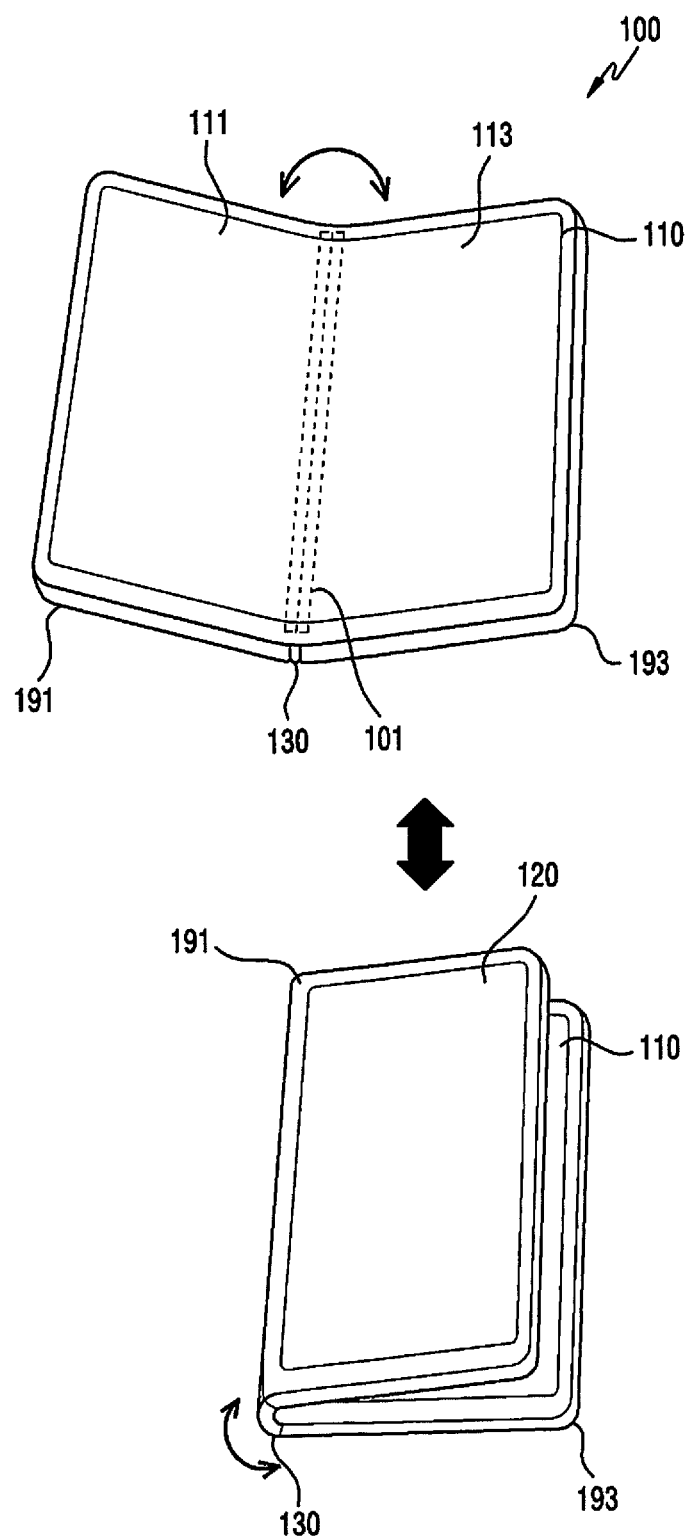
FIG. 1 illustrates opening and closing states of a foldable electronic device according to an embodiment.

Hereinafter, various embodiments will be described with reference to the accompanying drawings. For convenience of description, the components illustrated in the drawings may be exaggerated or reduced in size, and the disclosure is not necessarily limited to the illustrated ones. Additionally, the same or similar components illustrated in the drawings may be denoted by the same or similar reference numerals.

FIG. 1 illustrates opening and closing states of a foldable electronic device according to an embodiment.

Figure 2:
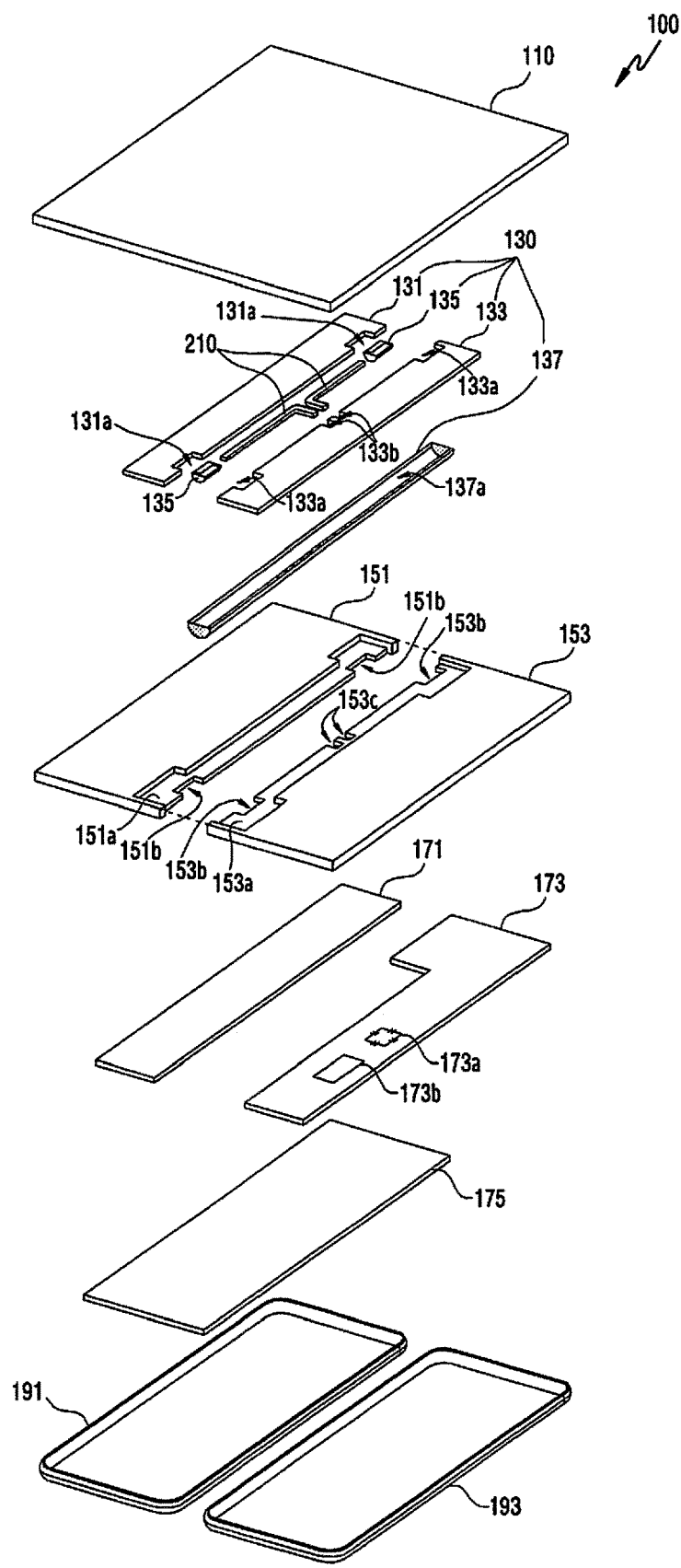
FIG. 2 illustrates a foldable electronic device according to an embodiment.

FIG. 2 illustrates a foldable electronic device according to an embodiments.

Figure 3:
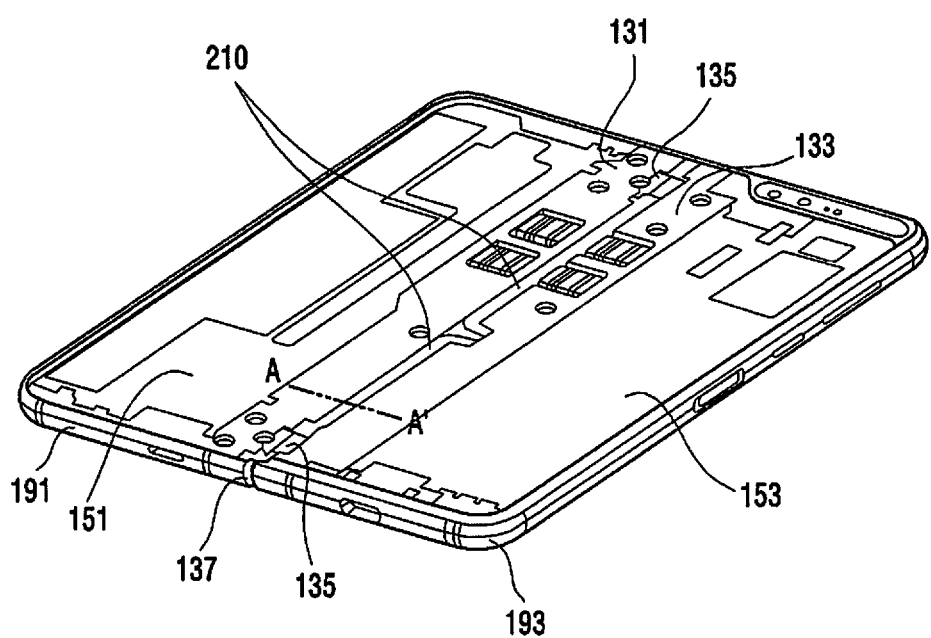
FIG. 3 illustrates a foldable electronic device in which a flexible display is not assembled according to an embodiment.

FIG. 3 illustrates a foldable electronic device in which a flexible display is not assembled according to an embodiment.

Referring to FIGS. 1 to 3, in a foldable electronic device 100, two or more plates may be rotatably connected via a hinge 135 in order to be unfolded or folded. A hinge housing 137, which prevents entrance of foreign matter and has an aesthetically advantageous appearance, may be installed to a portion at which the hinge 135 is connected. The hinge housing 137 may have an air space 137*a* therein. A heat diffusion member 210 (e.g., a heat pipe) is disposed in the space 137*a* or at a position communicating with the space 137. Thus, it is possible to utilize the hinge housing 137 to control heat generation.

During the opening/closing of the foldable electronic device 100, stress may be generated in a portion 101 at which the flexible display 110 is folded and may be increased due to a sudden temperature change, which may result in a defective phenomenon such as buckling deformation, cracking, or peeling in that portion 101. To address this problem, in the foldable electronic device 100, a sudden temperature change of the flexible display 110 may be controlled via the heat diffusion member 210.

In order to provide the above-described functions, the foldable electronic device 100 includes a flexible display 110, a hinge assembly 130, a heat diffusion member 210, brackets 151 and 153, printed circuit boards 171 and 173, a battery 175, and outer housings 191 and 193. However, the configuration of the foldable electronic device 100 is not limited thereto. For example, at least one of the above-described elements may be omitted the foldable electronic device 100, or the foldable electronic device 100 may include at least one other element. For example, the foldable electronic device 100 further includes an outer display 120.

The flexible display 110 may display various contents (e.g., a text, an image, a video, an icon, or a symbol) to the user. The flexible display 110 may include a display panel, a touch panel provided on or integrally formed on the display panel, and a window layer provided on the touch panel. The display panel, the touch panel, and the window layer may be attached to each other by a pressure-sensitive adhesive (PSA).

The window layer may include a highly flexible, hard, and transparent plastic film for manufacturing the flexible display 110. The plastic film may include a polyimide or polyethylene terephthalate (PET) film.

The window layer may also be formed of a plurality of plastic films. In this case, the plurality of plastic films may be attached to each other via a pressure-sensitive adhesive.

The display panel may include a flexible display substrate, a plurality of display elements coupled to the display substrate, at least one conductive line coupled to the display substrate and electrically connected to the display elements, and a thin film encapsulation layer. The display substrate may be made of a flexible plastic material. The display substrate may be made of various materials having a flexible property.

The display elements may be disposed on the display substrate and form a plurality of pixels. For example, the display elements may be arranged in a matrix form on the display substrate so as to form the pixels of the display panel, and may include a fluorescent material or an organic fluorescent material that is capable of expressing colors. The display elements may include an organic light-emitting diode (OLED).

The conductive line may include at least one gate signal line or at least one data signal line. The conductive line may include a plurality of gate signal lines and a plurality of data signal lines. In this case, the gate signal lines and the data signal lines may be arranged in a matrix, and the display elements may be aligned to be adjacent to a point where the lines intersect to be electrically connected to the lines.

The thin film encapsulation layer may cover the display substrate, the display elements, and the conductive line so as to prevent inflow of oxygen and moisture from the outside. The thin film encapsulation layer may also be formed by stacking one or more organic layers and one or more inorganic layers alternately. In this case, the uppermost layer may be exposed to the outside of the thin film encapsulation layer using an inorganic layer in order to prevent moisture permeation.

The flexible display 110 may further include a polarization film disposed between the display panel and the touch panel. The polarization film may reduce thickness and may improve visibility of an image while securing a flexible characteristic. The flexible display 110 may further include a phase delay film between the display panel and the window layer. The phase delay film may serve to change linearly polarized light into circularly polarized light or to change circularly polarized light into linearly polarized light. The flexible display 110 may further include a cushion layer attached to the lower portion of the display panel via an adhesive tape or a pressure-sensitive adhesive.

The hinge assembly 130 allows the foldable electronic device 100 to be folded or unfolded. The hinge assembly 130 includes a first hinge frame 131, a second hinge frame 133, one or more hinges 135, and a hinge housing 137.

The first hinge frame 131 and the second hinge frame 133 are portions in each of which one side of the hinge assembly 130 is fixed during the opening/closing of the foldable electronic device 100, and may be coupled to the outer housings 191 and 193 or brackets 151 and 153 coupled to the outer housings 191 and 193. The first hinge frame 131 and the second hinge frame 133 may be coupled to a first outer housing 191 (or a first bracket 151) and a second outer housing 193 (or a second bracket 153), respectively, so as to support the first outer housing and the second outer housing when the flexible display 110 is folded or unfolded about the folding portion 101 of the foldable electronic device 100.

The hinge 135 pivotally connects the first hinge frame 131 and the second hinge frame 133 to each other. The first hinge frame 131 includes first grooves 131a in each of which one portion of the hinge 135 is seated and coupled to a side facing the second hinge frame 133, and the second hinge frame 133 includes second grooves 133a in each of which another portion of the hinge 135 is seated and coupled to a side facing the first hinge frame 131. The first grooves 131a and the second grooves 133a may be formed to be aligned at positions symmetrical to each other about the folding portion 101. The first groove 131a and the second groove 133a may be formed at positions symmetrical to each other about the central axis of the foldable portion 101 (the center line on which the foldable electronic device 100 is folded). The hinge 135 may be disposed at a position overlapping the folding portion 101 when the foldable electronic device 100 is viewed from above the front face (or the top surface).

The hinge assembly 130 may include a plurality of hinges 135 in order to ensure a stronger coupling force than that of the first hinge frame 131 and the second hinge frame 133. For example, as illustrated in FIGS. 2 and 3, the hinge assembly 130 includes two hinges 135. The hinges 135 may be spaced apart from each other by a predetermined distance in the length direction (or the longitudinal direction) (in the central axis direction of the folding portion 101) so as to be disposed at a positions overlapping the folding portions 101 when the foldable electronic device 100 is viewed from above the front face (or the top face) thereof.

In FIGS. 2 and 3, one hinge 135 is disposed above the longitudinal direction of the foldable electronic device 100, and the other hinge 135 is disposed below the longitudinal direction of the foldable electronic device 100. Accordingly, the first grooves 131a are formed at two positions in the first hinge frame 131 such that the two hinges 135 are seated and coupled thereto, and the second grooves 133a are also formed at two positions in the second hinge frame 133.

The hinge housing 137 may connect the first hinge frame 131 and the second hinge frame 133 to each other, and may accommodate the one or more hinges 135. The hinge housing 137 includes a front face (or a top face), a rear face (or a bottom face), and a side face partially enclosing a space between the front face and the rear face, in a portion of the front face is recessed rearwards. In addition, the side face to the rear face may include an integrally connected curved face. The curved face may have a substantially straight line shape when viewed in a longitudinal cross section of the foldable electronic device 100, but may have a substantially semicircular shape when viewed in a width direction (or horizontal) cross section of the foldable electronic device 100 The hinge housing 137 may be provided in a semi-cylindrical shape protruding rearwards and extending in the longitudinal direction of the foldable electronic device 100.

The hinge housing 137 has an empty space 137a therein. The hinge housing 137 may form an empty space 137a in which a portion of the front face is recessed rearwards. The space 137a may be filled with air when the hinge housing 137 is coupled to the first hinge frame 131 and the second hinge frame 133. When one side edge of the front face of the hinge housing 137 is coupled to the first hinge frame 131 and the other side edge of the front face of the hinge housing 137 is coupled to the second hinge frame 133, the space 137a is formed between the first and second hinge frames 131 and 133 and the hinge housing 137, and the at least one hinge 135 is to be accommodated in this space 137a.

The heat diffusion member 210 may efficiently circulate heat using the phase change of the working fluid. The heat diffusion member 210 is capable of transferring heat quickly since the working fluid, which is introduced into a vacuum-sealed tube, absorbs heat from a high-temperature portion, vaporizes, moves to a low-temperature portion, condenses, and dissipates heat. A heat pipe may be used as the heat diffusion member 210.

The heat diffusion member 210 may include a tube including a pair of metal plates, a pair of inner wall metal layers, and an intermediate metal layer, and a working fluid introduced into the tube. The metal plates are portions constituting opposite side faces of the outer wall of the tube of the heat diffusion member 210, and may include a metal material having a high thermal conductivity so as to absorb/release heat from/to the outside. Since the metal plates constitute the opposite side faces of the heat diffusion member 210, a pair of metal plates may be provided and disposed to face each other.

The inner wall metal layers constitute the inner walls of the tube body of the heat diffusion member 210, and may be formed on the facing faces of the pair of metal plates. Grooves may be formed in the inner wall metal layers, and the grooves may serve as a wick forming a capillary force, thereby forming a circulation path for returning the condensed working fluid. The grooves may be selectively exposed to the chamber and fluid path formed by the intermediate metal layer.

The intermediate metal layer is a portion at which the chamber and the fluid path are formed, and may form a side wall of the heat diffusion member 210 to seal the inside thereof. The intermediate metal layer may be interposed between the pair of inner wall metal layers, and a first chamber serving as an evaporator for absorbing heat and a second chamber serving as a condenser for dissipating heat may be formed on one side and the other side of the intermediate metal layer, respectively. In addition, a plurality of fluid paths connecting the chambers may be formed therein.

The heat diffusion member 210 may be disposed on or adjacent to an electronic component that generates heat (e.g., an application processor (AP), a central processing unit (CPU), or a power management integrated circuit (PMIC)) among the electronic components mounted on the printed circuit boards 171 and 173 so as to dissipate heat generated from the electronic components into the air in the inner empty space 137a of the hinge housing 137. One end of the heat diffusion member 210 may be disposed on or adjacent to an electronic component mounted on the printed circuit boards 171 and 173, and the other end of the heat diffusion member 210 may be disposed in the inner empty space 137a of the hinge housing 137 or at a position communicating with the space 137a.

FIGS. 2 and 3 illustrate that first ends of two heat diffusion members 210 are disposed on or adjacent to a processor 173a mounted on the second printed circuit board 173 among the printed circuit boards 171 and 173, and second ends of the two heat diffusion members 210 are disposed in the inner empty space 137a of the hinge housing 137.

In order to dispose a first end of each heat diffusion member 210 on or adjacent to the processor 173a mounted on the second printed circuit board 173, the first end of the heat diffusion member 210 may be disposed on or adjacent to the processor 173a through third grooves 133b formed in the second hinge frame 133. The third grooves 133b may be formed in a side portion of the second hinge frame 133 facing the first hinge frame 131, and the number of third grooves 133b may correspond to the number of the heat diffusion members 210.

In order to dispose the first end of each heat diffusion member 210 on or adjacent to an electronic component that is another heat source mounted on the first printed circuit board 171, a fourth groove is formed on the side of the first hinge frame 131 facing the second hinge frame 133 and one end of the heat diffusion member 210 may be mounted on or adjacent to the electronic component mounted on the first printed circuit board 171 through the fourth groove.

In order to increase the contact area with the air in the inner empty space 137a of the hinge housing 137, a partial area of the heat diffusion member 210 including the second end thereof may be disposed to be elongated in the longitudinal direction of the foldable electronic device 100. For example, as illustrated in FIGS. 2 and 3, a first end of the first heat diffusion member 210 may be disposed on or adjacent to the processor 173a through one third groove 133b formed in the second hinge frame 133, and a partial area including the second end of the first heat diffusion member 210 may be bent from the first end of the first heat diffusion member 210 so as to be disposed to be elongated above the longitudinal direction of the foldable electronic device 100 between the first hinge frame 131 and the second hinge frame 133. The first end of the second heat diffusion member 210 may be disposed on or adjacent to the processor 173a through another third groove 133b formed in the second hinge frame 133, and a partial area including the second end of the second heat diffusion member 210 may be bent from the first end of the second heat diffusion member 210 may be disposed to be elongated below the longitudinal direction of the foldable electronic device 100 between the first hinge frame 131 and the second hinge frame 133.

When the first end of each heat spreading member 210 is disposed on or adjacent to an electronic component mounted on the first printed circuit board 171 through the fourth groove formed in the first hinge frame 131, the partial area including the second end of the heat diffusion member 210 may be bent from the first end of the heat diffusion member 210 so as to be disposed to be elongated above or below the longitudinal direction of the foldable electronic device 100 between the first hinge frame 131 and the second hinge frame 133.

The heat diffusion members 210 may be bonded to the electronic components or the printed circuit boards 171 and 173 using a material having excellent thermal conductivity or double-sided tape having an excellent thermal conductivity.

The brackets 151 and 153 may fix and support the hinge assembly 130. For example, a first hinge frame 131 of the hinge assembly 130 may be seated on and fixed to a first seating portion 151a formed on the right edge portion of the first bracket 151 located on the left side in the width direction of the foldable electronic device 100, and a second hinge frame 133 of the hinge assembly 130 may be seated on and fixed to a second seating portion 153a formed on the left edge portion of the second bracket 153 located on the right side in the width direction of the foldable electronic device 100. Each of the first hinge frame 131 and the second hinge frame 133 may be fixed to the first seating portion 151a and the second seating portion 153a, respectively, via an adhesive member or a screw member.

The first seating portion 151a formed on the first bracket 151 may be recessed rearwards from the front face of the first bracket 151 (e.g., the face of the first bracket 151 facing the first hinge frame 131). The shape of the first seating portion 151a may correspond to the shape of the first hinge frame 131. The recessed length, width, and height of the first seating portion 151a may be the same as or similar to the length, width, and height of the hinge frame 131. The first seating portion 151a may include a first insertion groove 151b, into which a portion of the hinge 135 may be inserted, in the side portion thereof (e.g., a right portion) facing the second seating portion 153a.

The second seating portion 153a formed on the second bracket 153 may be recessed rearwards from the front face of the second bracket 153 (e.g., the face of the second bracket 153 facing the second hinge frame 133). The shape of the second seating portion 153a may correspond to the shape of the second hinge frame 133. The recessed length, width, and height of the second seating portion 153a may be the same as or similar to the length, width, and height of the second hinge frame 133. The second seating portion 153a may include a second insertion groove 153b, into which a portion of the hinge 135 may be inserted, in the side portion thereof (e.g., a left portion) facing the first seating portion 151a.

The first insertion grooves 151b and the second insertion grooves 153b may be formed to be aligned at positions symmetrical to each other about the folding portion 101. The first insertion grooves 151b and the second insertion grooves 153b may be formed to be aligned at positions symmetrical to each other about the central axis of the folding portion 101.

In order to dispose the first end of each heat diffusion member 210 on or adjacent to the processor 173a mounted on the second printed circuit board 173, the second seating portion 153a may include third insertion grooves 153c into each of which the first end of the heat diffusion member 210 may be inserted. The third insertion grooves 153c may be formed in the side portion of the second seating portion 153a facing the first seating portion 151a, and may be disposed to be aligned to the positions overlapping the third grooves 133b formed in the second hinge frame 133 when the foldable electronic device 100 is viewed from above the front face thereof.

In order to dispose the first end of each heat diffusion member 210 on or adjacent to an electronic component mounted on the first printed circuit board 171 when the first end of the heat diffusion member 210 passes through a fourth groove formed in the first hinge frame 131, the first seating portion 151a may include fourth insertion grooves into each of which the first end of the heat diffusion member 210 may be inserted. In this case, the fourth insertion grooves may be formed in the side portion of the first seating portion 151a facing the second seating portion 153a, and may be disposed to be aligned to the positions overlapping the fourth grooves formed in the first hinge frame 131 when the foldable electronic device 100 is viewed from above the front face thereof.

The brackets 151 and 153 may fix and support the flexible display 110. The flexible display 110 may be disposed on the brackets 151 and 153 on which the hinge assembly 130 is fixedly seated. For example, when the first hinge frame 131 is fixedly seated on the first seating portion 151a and the second hinge frame 133 is fixedly seated on the second seating portion 153a, the flexible display 110 may be disposed on the first bracket 151, the first hinge frame 131, the second hinge frame 133, and the second bracket 153. In this case, a first area (e.g., the left area) of the flexible display 110 may be attached to the first bracket 151 and the first hinge frame 131 via a first adhesive member, and a second area (e.g., the right area) of the flexible display 110 may be attached to the second bracket 153 and the second hinge frame 133 via a second adhesive member. The first adhesive member and the second adhesive member may include a pressure-sensitive adhesive.

Various electronic components may be mounted on the printed circuit boards 171 and 173. For example, one or more electronic devices or circuit lines may be mounted on the printed circuit boards 171 and 173, and at least some of them may be electrically connected to each other. The electronic components may include a processor 173a, a memory 173b, a PMIC, and a communication circuit.

FIG. 2 illustrates the foldable electronic device 100 including the first printed circuit board 171 and the second printed circuit board 173, but the foldable electronic device 100 is not limited thereto. Alternatively, one of the first printed circuit board 171 and the second printed circuit board 173 may be omitted from the foldable electronic device 100, and the foldable electronic device 100 may further include one or more other printed circuit boards.

Although FIG. 2 illustrates the first printed circuit board 171 and the second printed circuit board 173 being separated from each other, the first printed circuit board 171 and the second printed circuit 173 may be electrically connected to each other or may be integrally provided. When the first printed circuit board 171 and the second printed circuit board 173 are integrally provided, the first printed circuit board 171 and the second printed circuit board 173 may be disposed to overlap the first bracket 151 or the second bracket 153 when the foldable electronic device 100 is viewed from above the front face. Alternatively, when the first printed circuit board 171 and the second printed circuit board 173 are integrally provided, at least one of the first printed circuit board 171 and the second printed circuit board 173 may include a flexible printed circuit board.

The battery 175 may supply power to the foldable electronic device 100. For example, the battery 175 may be electrically connected to the printed circuit boards 171 and 173 so as to supply power to electronic components (e.g., the processor 173a, the memory 173b, etc.) mounted on the printed circuit boards 171 and 173. The battery 175 may be provided integrally with the foldable electronic device 100 or may be detachably provided.

The outer housings 191 and 193 may protect at least one face of the foldable electronic device 100 from an external shock. The outer housings 191 and 193 may form the rear exterior of the foldable electronic device 100 together with the hinge housing 137. The outer housings 191 and 193 may include a first outer housing 191 accommodating the first bracket 151 and the first hinge bracket 131 fixedly seated on the first bracket 151 and a second outer housing 193 accommodating the second bracket 153 and the second hinge bracket 133 fixedly seated on the second bracket 153.

Each of the first outer housing 191 and the second outer housing 193 may include a front face, a rear face, and a side face partially surrounding the space between the front face and the rear face. The side face refers to the face that is visually seen when a thin face of the foldable electronic device 100 is viewed, the front face refers to an area other than the side face and the face on which a screen output through the flexible display 110 is exposed to the outside, and the rear face refers to a face that faces away from the front face. A partial screen of the flexible display 110 may be exposed to the outside through the rear face and/or the side face. However, the front face of the flexible display 110 may be provided such that the entire area thereof outputs the screen of the flexible display 110 unlike the rear face and/or the side face.

The outer housings 191 and 193 may fixedly support the inner components of the foldable electronic device 100. For example, the first housing 191 may provide a space in which the first hinge frame 131, the first bracket 151, the first printed circuit board 171, etc., are seated, and may fixedly support the seated components. The second housing 193 may provide a space in which the second hinge frame 133, the second bracket 153, the second printed circuit board 173, etc., are seated, and may fixedly support the seated components.

The first outer housing 191 and the second outer housing 193 may be connected via the hinge assembly 130. For example, the first bracket 151 to which the first hinge frame 131 is fixed may be fixedly accommodated in the first outer housing 191, the second bracket 153 to which the second hinge frame 133 is fixed may be fixedly accommodated in the second outer housing 193, and at least one hinge 135, which rotatably connects the first hinge frame 131 and the second hinge frame 133, and the hinge housing 137, which accommodates the at least one hinge 135 and connects the first hinge frame 131 and the second hinge frame 133, may be disposed between the first outer housing 191 and the second outer housing 193. In this case, a side portion of the first hinge frame 131 facing the second hinge frame 133 may be fixedly inserted into an opening formed in the side face of the first outer housing facing the second outer housing 193, and a side portion of the second hinge frame 133 facing the first hinge frame 131 may be fixedly inserted into an opening formed in the side face of the second outer housing facing the first outer housing 191. The hinge housing 137 may be fixed to the side face of the first outer housing 191 and the side face of the second outer housing 193 corresponding thereto. For example, the hinge housing 137 may have a left edge fixed to the right face of the first outer housing 191 and a right edge fixed to the left face of the second outer housing 193.

As described above, the foldable electronic device 100 may be folded at the hinge 135. Because the flexible display 110 is disposed from the first bracket 151 to the second bracket 153 across the first hinge frame 131, the hinge 135, and the second hinge frame 133, the flexible display 110 is capable of being folded or unfolded with the foldable electronic device 100 by the opening/closing operation of the foldable electronic device 100. For example, the foldable electronic device 100 is capable of being folded or unfolded about the folding portion 101 having a predetermined length in the longitudinal direction of the foldable electronic device 100 while having a width overlapping the hinge 135 in the width direction of the hinge 135 in the width direction of the foldable electronic device 100 when the foldable electronic device 100 is viewed from above the front face thereof. In this case, the foldable electronic device 100 may provide a first state (unfolded state) in which the flexible display 110 is unfolded about the folding portion 101 so that a first area (e.g., the left area) and a second area (e.g., the right area) substantially flush with each other, and a second state (folded state) in which the flexible display 110 is folded about the folding portion 101 so that the first area and the second area face each other.

The foldable electronic device 100 may include a plurality of hinge assemblies 130. The hinge assemblies 130 may be provided in accordance with the number of folding portions 101 of the foldable electronic device 100. Since the foldable electronic device 100 may be folded or unfolded with reference to the hinges 135 of the hinge assemblies 130, the foldable electronic device 100 may be provided with the same number of hinge assemblies 130 as the number of folding portions 101 thereof.

Figure 4:
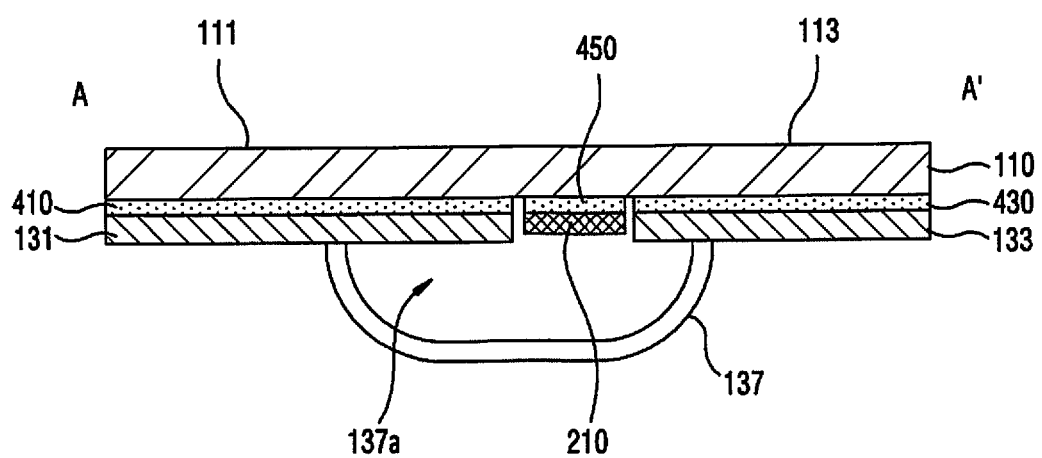
FIG. 4 illustrates a folding portion of a foldable electronic device including a heat diffusion member according to an embodiment.

FIG. 4 illustrates a folding portion of a foldable electronic device including a heat diffusion member according to an embodiment.

Referring to FIG. 4, a first hinge frame 131 is disposed on the left side and a second hinge frame 133 is disposed on the right side with reference to a central axis of a folding portion of a foldable electronic device. The first hinge frame 131 is attached to the rear face of a first area 111 of a flexible display 110 via a first adhesive member 410, and the second hinge frame 133 is attached to a rear face of a second area 113 of the flexible display 110 via a second adhesive member 430. The first adhesive member 410 and the second adhesive member 430 may include a pressure-sensitive adhesive. The first hinge frame 131 and the second hinge frame 133 may be connected by at least one hinge, and the hinge housing 137 covers the at least one hinge so as to form the exterior of the foldable electronic device 100. A space 137a may be formed between the first and second hinge frames 131 and 133 and the hinge housing 137.

The separation distance between the second hinge frame 133 and the central axis of the folding portion may be smaller than the separation distance between the first hinge frame 131 and the central axis of the folding portion. For example, the second hinge frame 133 may be spaced apart from the central axis of the folding portion by a predetermined distance.

A heat diffusion member 210 is disposed between the second hinge frame 133 and the central axis of the folding portion. For example, the heat diffusion member 210 may be disposed on the right side with reference to the central axis of the folding portion 101, and the second hinge frame 133 may be disposed on the right side of the heat diffusion member 210. The heat diffusion member 210 is attached to the rear face of the second area 113 of the flexible display 110 via a third adhesive member 450. The third adhesive member 450 may include a pressure-sensitive adhesive.

In order to increase the contact area with the air in the inner empty space 137a, the heat diffusion member 210 may be disposed to be elongated in the longitudinal direction of the foldable electronic device. For example, in FIG. 4, the heat diffusion member 210 may be elongated in the direction perpendicular to the drawing sheet.

Figure 5:
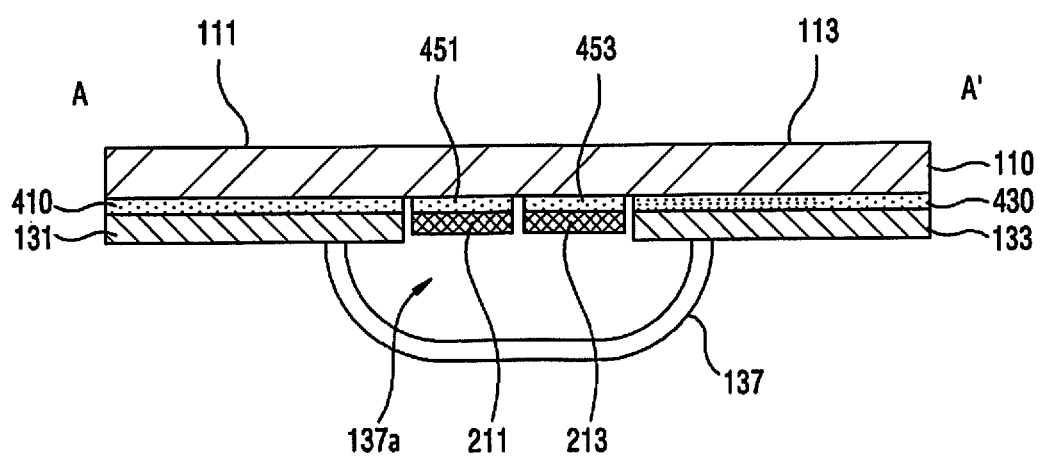
FIG. 5 illustrates a folding portion of a foldable electronic device including a plurality of heat diffusion members according to an embodiment.

FIG. 5 illustrates a folding portion of a foldable electronic device including a plurality of heat diffusion members according to an embodiment. With reference to FIG. 5, a description of elements having the same arrangement structure as in FIG. 4 may be omitted below.

Referring to FIG. 5, similar to FIG. 4, a first hinge frame 131 is disposed on the left side and a second hinge frame 133 is disposed on the right side with reference to the central axis of the folding portion of the foldable electronic device. However, unlike that in FIG. 4, the separation distance between the second hinge frame 133 and the central axis of the folding portion may be substantially equal to the separation distance between the first hinge frame 131 and the central axis of the folding portion. For example, the first hinge frame 131 is spaced apart from the central axis of the folding portion by a predetermined distance, and the second hinge frame 133 is also spaced apart from the central axis of the folding portion, in which the distances may be equal to each other.

A first heat diffusion member 211 is disposed between the first hinge frame 131 and the central axis of the folding portion, and a second heat diffusion member 213 is disposed between the second hinge frame 133 and the central axis of the folding portion. For example, the first heat diffusion member 211 is disposed on the left side with reference to the central axis of the folding portion, and the first hinge frame 131 is disposed on the left side of the first heat diffusion member 211. The second heat diffusion member 213 is disposed on the right side with reference to the central axis of the folding portion, and the second hinge frame 133 is disposed on the right side of the second heat diffusion member 213. The first heat diffusion member 211 is attached to the rear face of the first area 111 of the flexible display 110 via a fourth adhesive member 451, and the second heat diffusion member 213 is attached to the rear face of the second area 113 of the flexible display 110 via a fifth adhesive member 453. The fourth adhesive member 451 and the fifth adhesive member 453 may include a pressure-sensitive adhesive.

In order to increase the contact area with the air in the inner empty space 137a, the first heat diffusion member 211 and the second heat diffusion member 213 may be disposed to be elongated in the longitudinal direction of the foldable electronic device.

At least one of the first heat diffusion member 211 and the second heat diffusion member 213 may be stacked on another heat diffusion member in the height direction of the foldable electronic device (a direction parallel to a normal direction of the front face of the foldable electronic device). For example, referring to FIG. 5, another third heat diffusion member may be attached to the bottom face (or the rear face) of the first heat diffusion member 211, and another fourth heat diffusion member may be further attached to the bottom face of the second heat diffusion member 213. Accordingly, the contact area with the air in the space 137a may be increased, which may result in faster heat dissipation.

Figure 6:
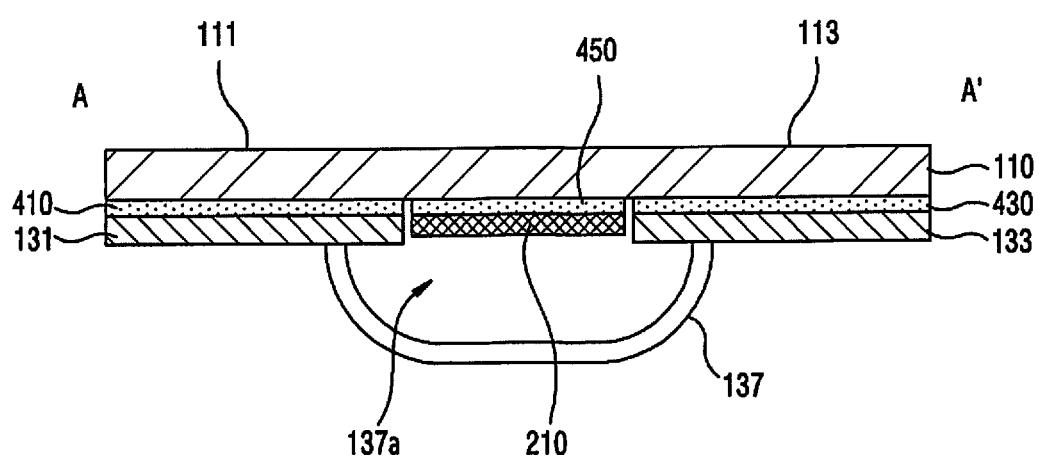
FIG. 6 illustrates a folding portion of a foldable electronic device including a flexible heat diffusion member according to an embodiment.

FIG. 6 illustrates a folding portion of a foldable electronic device including a flexible heat diffusion member according to an embodiment. With reference to FIG. 6, a description of elements having the same arrangement structure as in FIGS. 4 and 5 may be omitted below.

Referring to FIG. 6, a first hinge frame 131 is disposed on the left side and a second hinge frame 133 is disposed on the right side with reference to the central axis of the folding portion of the foldable electronic device. A heat diffusion member 210 is disposed between the first hinge frame 131 and the central axis of the folding portion, and t between the second hinge frame 133 and the central axis of the folding portion. For example, an integrally formed heat diffusion member 210 may be disposed between the first hinge frame 131 and the second hinge frame 133.

Because the heat diffusion member 210 is integrally disposed across the central axis of the foldable portion, the heat diffusion member 210 may be folded or unfolded with the foldable electronic device according to the opening/closing operation of the foldable electronic device. Accordingly, the heat diffusion member 210 should have a flexible property. A flexible-type heat diffusion member may also be used as the heat diffusion members illustrated in FIGS. 4 and 5.

Figure 7:
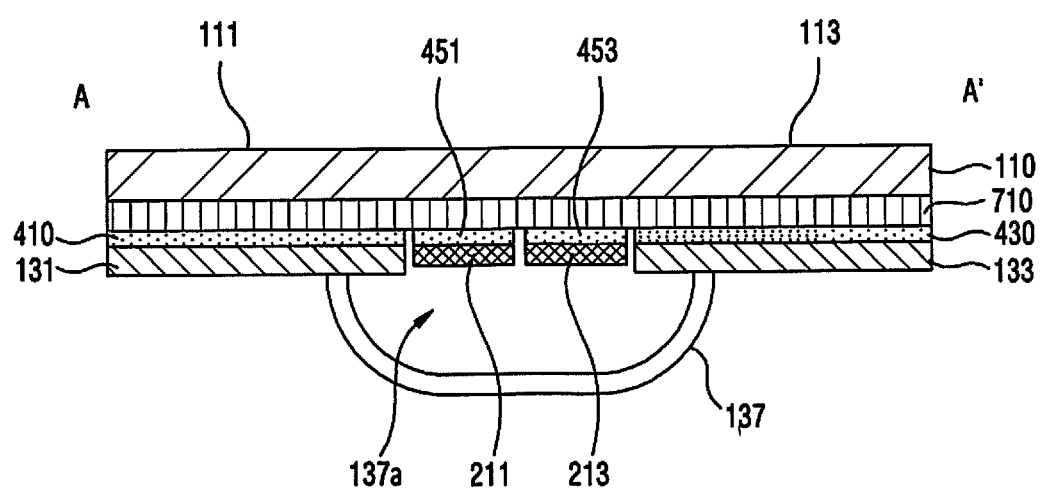
FIG. 7 illustrates a folding portion of a foldable electronic device including a heat dissipation sheet according to an embodiment.
Figure 8:
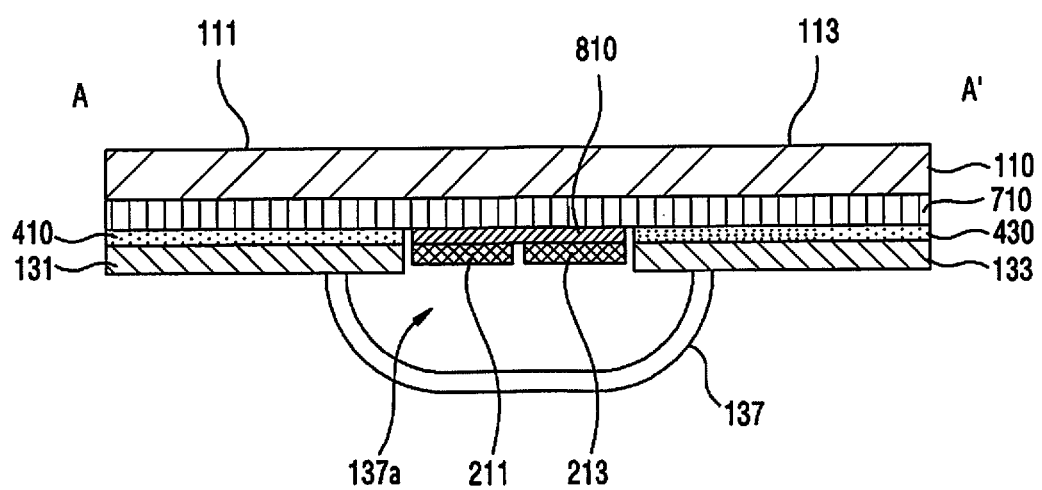
FIG. 8 illustrates a folding portion of a foldable electronic device including a heat-conductive sheet according to an embodiment.

FIG. 7 illustrates a folding portion of a foldable electronic device including a heat dissipation sheet according to an embodiment, and FIG. 8 illustrates a folding portion of a foldable electronic device including a heat-conductive sheet according to an embodiment. The heat diffusion members illustrated in FIGS. 7 and 8 may be used for a heat dissipation function utilizing the inner space of a hinge housing, and may be used to control a sudden temperature change of a flexible display.

Referring to FIGS. 7 and 8, a first hinge frame 131 is disposed on the left side and a second hinge frame 133 is disposed on the right side with reference to the central axis of the folding portion of the foldable electronic device. A first heat diffusion member 211 is disposed between the first hinge frame 131 and the central axis of the folding portion, and a second heat diffusion member 213 is disposed between the second hinge frame 133 and the central axis of the folding portion. For example, the first heat diffusion member 211 is disposed on the left side with reference to the central axis of the folding portion, and the first hinge frame 131 is disposed on the left side of the first heat diffusion member 211. The second heat diffusion member 213 is disposed on the right side with reference to the central axis of the folding portion, and the second hinge frame 133 is disposed on the right side of the second heat diffusion member 213.

A heat dissipation sheet 710 is attached to the rear face of the flexible display 110. The heat dissipation sheet 710 may cause the heat transferred from the first heat diffusion member 211 and the second heat diffusion member 213 to the flexible display 110 to be evenly diffused towards the face thereof. In addition, the heat dissipation sheet 710 may cause heat generated from the flexible display 110 to be transferred to the first heat diffusion member 211 and the second heat diffusion member 213. The heat dissipation sheet 710 may be attached to the rear face of a cushion layer of the flexible display 110, and may be made of a material such as copper (Cu) or graphite.

Referring to FIG. 8, a heat-conductive sheet 810 is disposed between the first and second heat diffusion members 211 and 213 and the flexible display 110.

More specifically, FIG. 8 illustrates the heat dissipation sheet 710 being attached to the rear face of the flexible display 110, the heat-conductive sheet 810 being attached to the rear face of the heat dissipation sheet 710, and the first heat diffusion member 211 and the second heat diffusion member 213 being attached to the rear face of the heat-conductive sheet 810. The heat-conductive sheet 810 may be used in order to increase the heat transfer effect from the first heat diffusion member 211 and the second heat diffusion member 213 to the flexible display 110. The heat-conductive sheet 810 may be formed of a material having a high thermal conductivity.

The adhesive member for attaching the first heat diffusion member 211 and the second heat diffusion member 213 to the rear face of the flexible display 110 or the heat dissipation sheet 710 may made of a material having a high thermal conductivity. For example, in FIG. 7, the fourth adhesive member 451 and the fifth adhesive member 453 used for attaching each of the first heat diffusion member 211 and the second heat diffusion member 213 to the heat dissipation sheet 710 may be manufactured using a material having a high thermal conductivity improved by mixing a highly heat-conductive inorganic filler material with an adhesive polymer material.

Figure 9:
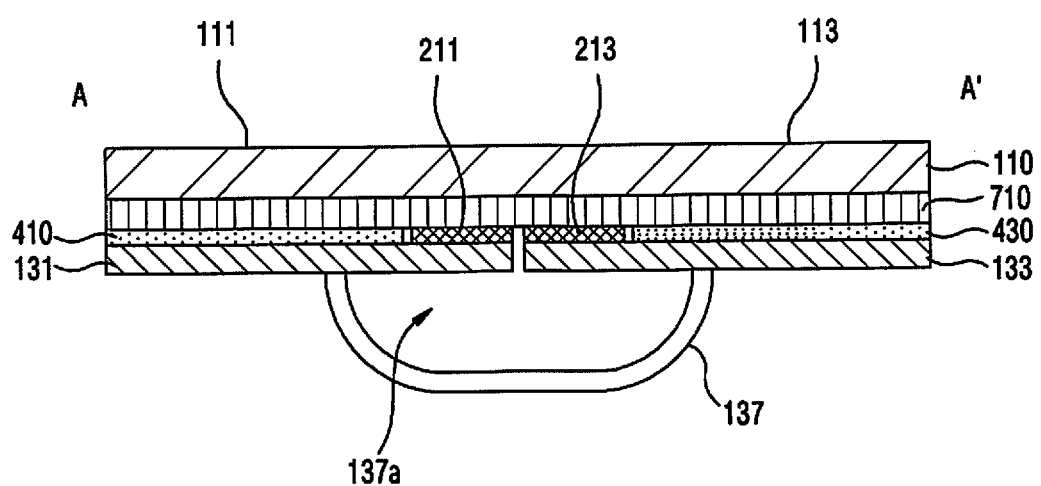
FIG. 9 illustrates a folding portion of a foldable electronic device including a heat diffusion member disposed on a front face of a hinge frame according to an embodiment.

FIG. 9 illustrates a folding portion of a foldable electronic device including a heat diffusion member on a front face of a hinge frame according to an embodiment.

Referring to FIG. 9, a first hinge frame 131 is disposed on the left side and a second hinge frame 133 is disposed on the right side with reference to the central axis of the folding portion of the foldable electronic device. A heat dissipation sheet 710 is attached to the rear face (the bottom face) of the flexible display 110, the first hinge frame 131 is attached to the rear face of the heat dissipation sheet 710 via a first adhesive member 410, and the second hinge frame 133 is attached to the rear face (or the bottom face) of the heat dissipation sheet 710 via a second adhesive member 430. Alternatively, the heat dissipation sheet 710 may be omitted. In this case, the first hinge frame 131 may be attached to the rear face of the first area 111 of the flexible display 110 via the first adhesive member 410, and the second hinge frame 133 may be attached to the rear face of the second area 113 of the flexible display 110 via the second adhesive member 430. The first adhesive member 410 and the second adhesive member 430 may include a pressure-sensitive adhesive.

In addition, the first hinge frame 131 and the second hinge frame 133 are connected by the hinge housing 137, and an air space 137a is formed between the first and second hinge frames 131 and 133 and the hinge housing 137.

The separation distance between the first hinge frame 131 and the central axis of the folding portion and the separation distance between the second hinge frame 133 and the central axis of the folding portion may be smaller than a predetermined size. For example, the distance between the first hinge frame 131 and the second hinge frame 133 may be small, so that the heat diffusion members 211 and 213 cannot be disposed between the first hinge frame 131 and the second hinge frame 133. In this case, the heat diffusion members 211 and 213 may be disposed between the first and second hinge frames 131 and 133 and the flexible display 110. For example, as illustrated in FIG. 9, the first heat distribution member 211 may be disposed between the first hinge frame 131 and the heat dissipation sheet 710 attached to the rear face of the flexible display 110, and the second heat diffusion member 213 may be disposed between the second hinge frame 133 and the heat dissipation sheet 710 attached to the rear face of the flexible display 110.

In order to increase the heat diffusion rate into the space 137a, the distance between the first hinge frame 131 and the second hinge frame 133 may be maintained at a predetermined size or more. Alternatively, at least one of the first hinge frame 131 and the second hinge frame 133 may include a material having a high thermal conductivity.

Figure 10A:
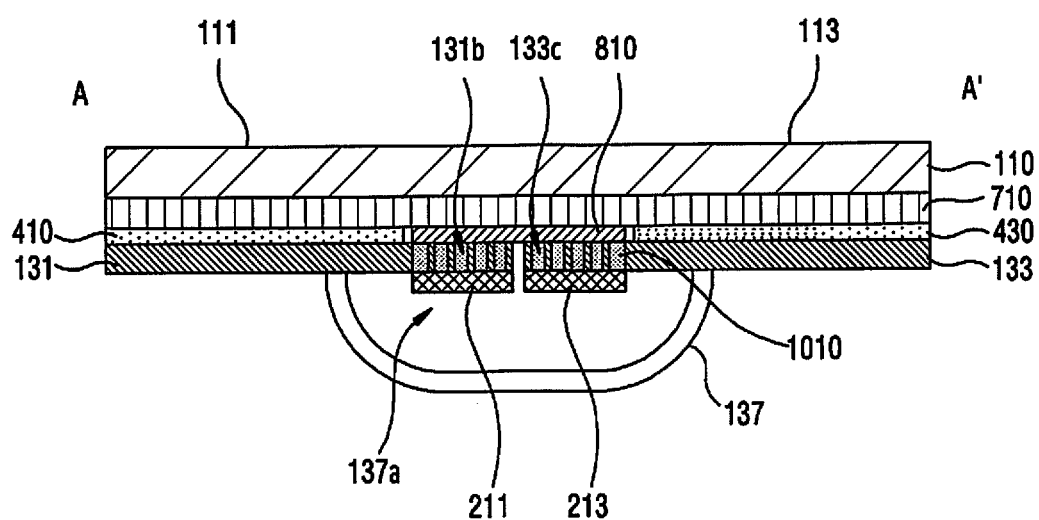
FIG. 10A illustrates a folding portion of a foldable electronic device including a heat diffusion member disposed on a rear face of a hinge frame according to an embodiment.
Figure 10B:
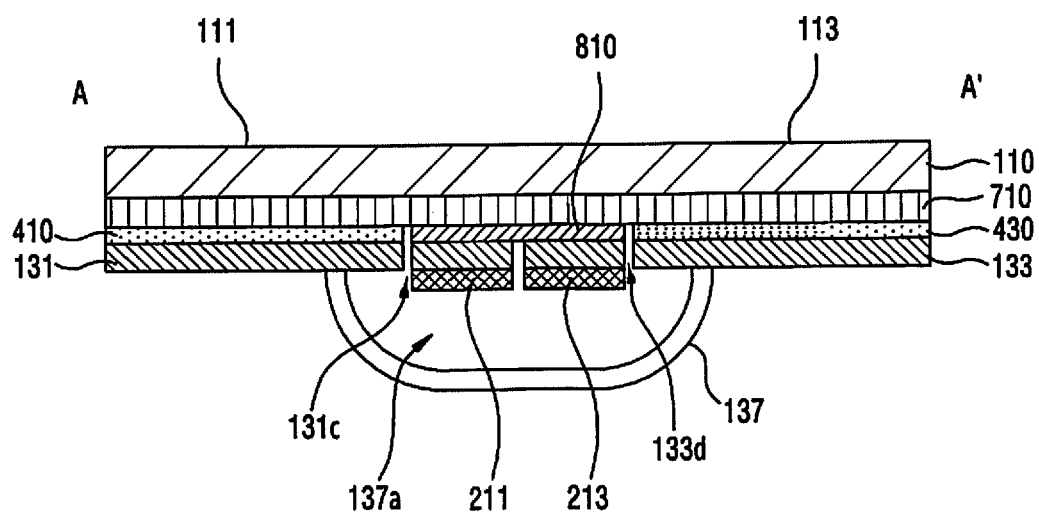
FIG. 10B illustrates a folding portion of a foldable electronic device including a heat diffusion member disposed on a rear face of a hinge frame according to an embodiment.

FIG. 10A illustrates a folding portion of a foldable electronic device including a heat diffusion member on a rear face of a hinge frame according to an embodiment, and FIG. 10A illustrates a folding portion of a foldable electronic device including a heat diffusion member on a rear face of a hinge frame according to another embodiment. In the description of FIGS. 10A and 10B below, a description of components similar to those described with reference to FIG. 9 will be omitted.

Referring to FIGS. 10A and 10B, a first hinge frame 131 is disposed on the left side and a second hinge frame 133 is disposed on the right side with reference to the central axis of the folding portion of the foldable electronic device. A heat dissipation sheet 710 is attached to the rear face of the flexible display 110, the first hinge frame 131 is attached to the rear face of the heat dissipation sheet 710 via a first adhesive member 410, and the second hinge frame 133 is attached to the rear face of the heat dissipation sheet 710 via a second adhesive member 430. Alternatively, the heat dissipation sheet 710 may be omitted.

The separation distance between the first hinge frame 131 and the central axis of the folding portion and the separation distance between the second hinge frame 133 and the central axis of the folding portion may be smaller than a predetermined size. For example, when the distance between the first hinge frame 131 and the second hinge frame 133 is small, the heat diffusion members 211 and 213 may not be disposed between the first hinge frame 131 and the second hinge frame 133.

In addition, the separation distance between the first hinge frame 131 and the flexible display 110 (or the heat dissipation sheet 710) and the separation distance between the second hinge frame 133 and the flexible display 110 may be smaller than a predetermined size. For example, when the distance between the first and second hinge frames 131 and 133 and the flexible display 110 is small, the heat diffusion members 211 and 213 may not be disposed between the first and second hinge frames 131 and 133 and the flexible display 110. In this case, the heat diffusion members 211 and 213 may be disposed on the rear faces (or the bottom faces) of the first and second hinge frames 131 and 133. For example, as illustrated in FIGS. 10A and 10B, the first heat distribution member 211 may be disposed on the rear face of the first hinge frame 131, and the second heat diffusion member 213 may be disposed on the rear face of the second hinge frame 133.

In order to increase the heat transfer effect between the first and second heat diffusion members 211 and 213 and the flexible display 110, a heat-conductive sheet 810 may be attached to the rear face of the flexible display 110.

As illustrated in FIG. 10A, through holes may be formed in predetermined portions of the first hinge frame 131 and the second hinge frame 133 to which the first heat diffusion member 211 and the second heat diffusion member 213 are attached. For example, a first through hole 131b is formed in a portion of the first hinge frame 131 to which the first heat diffusion member 211 is attached, and a second through hole 133c is formed in a portion of the second hinge frame 133 to which the second heat diffusion member 213 is attached. At least one of the first through hole 131b and the second through hole 133c may be filled with a material 1010 having high heat transfer efficiency. The material 1010 may include, for example, thermal grease.

As illustrated in FIG. 10B, split portions 131c and 133d may be formed in predetermined portions of the first hinge frame 131 and the second hinge frame 133 to which the first heat diffusion member 211 and the second heat diffusion member 213 are attached. For example, a first split portion 131c is formed in the first hinge frame 131, and a second split portion 133d is formed in the second hinge frame 133. The first split portion 131c and the second split portion 133d may prevent the heat transmitted from the first heat diffusion member 211 and the second heat diffusion member 213 to the first hinge frame 131 from being diffused to the outside of the folding portion 101 along the first hinge frame 131 and the second hinge frame 133. The heat transferred from the first heat diffusion member 211 disposed on the right rear face (or the right bottom face) of the first hinge frame 131 with reference to the first split portion 131c may not be diffused to the left side of the first hinge frame 131 due to the first split portion 131c, and the heat transferred from the second heat diffusion member 213 disposed on the left rear face (or the left bottom face) of the second hinge frame 133 with reference to the second split portion 133d may not be diffused to the right side of the second hinge frame 133 due to the second split portion 133d.

Figure 11:
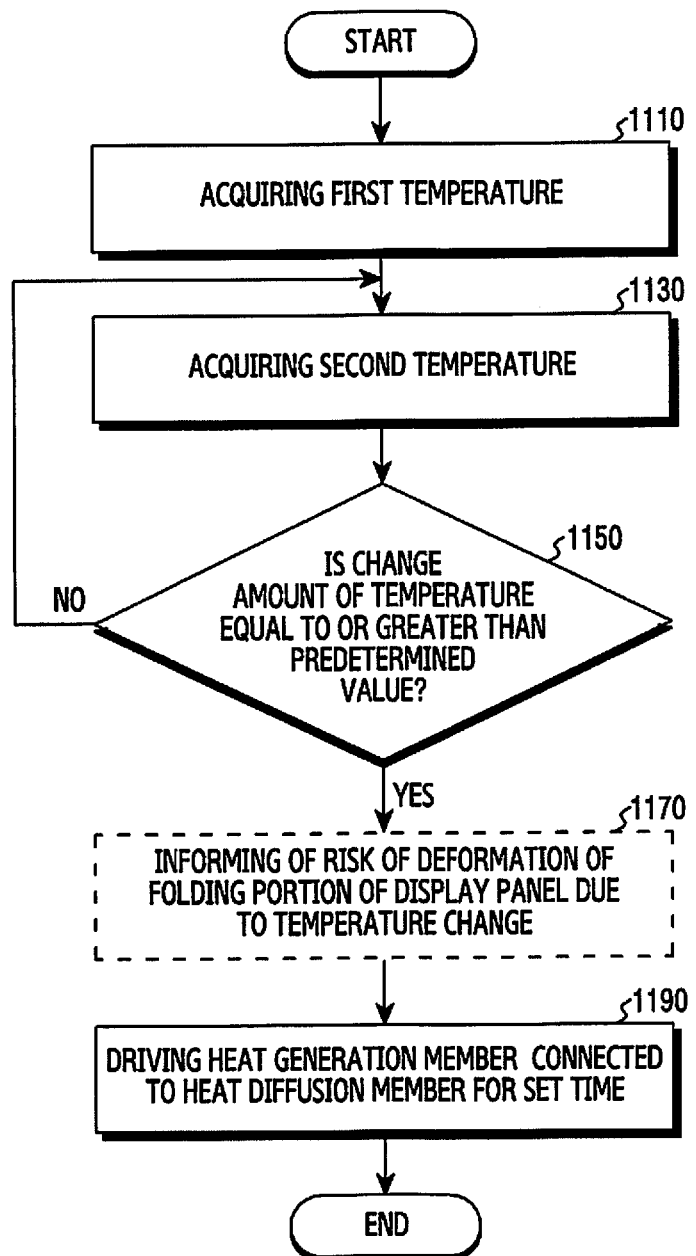
FIG. 11 illustrates a method for preventing deformation of a folding portion of a flexible display according to an embodiment.

FIG. 11 illustrates a method for preventing deformation of a folding portion of a flexible display according to an embodiment. For example, the method of FIG. 11 will be described as being performed by the foldable electronic device 100 as illustrated in FIGS. 1 to 3.

Referring to FIG. 11, in step 1110, the processor 173a of the foldable electronic device 100 acquires a first temperature t1 via a temperature sensor capable of measuring a temperature outside the foldable electronic device 100. The temperature sensor may be disposed on one face of the outer housing 191 or 193 of the foldable electronic device 100, or may be disposed in the inner empty space 137a of the hinge housing 137. The temperature sensor may be disposed on the rear face (or the bottom face) of the first hinge frame 131 or the second hinge frame 133 adjacent to the thermal diffusion member 210 within the space 137a formed between the first and second hinge frames 131 and 133 and the hinge housing 137.

In step 1130, the processor 173a acquires a second temperature t2 via the temperature sensor. The second temperature may be a temperature measured when a predetermined time elapses after the first temperature is measured. The first temperature may be measured when the foldable electronic device 100 is being folded, and the second temperature may be measured when a predetermined time elapses after the foldable electronic device 100 has been folded. Alternatively, the first temperature may be measured when the foldable electronic device 100 is being unfolded, and the second temperature may be measured when a predetermined time elapses after the foldable electronic device 100 has been unfolded. As another alternative, the first temperature may be measured when the foldable electronic device 100 is already unfolded (or folded), and the second temperature may be measured when a predetermined time elapses after the first temperature is measured while the foldable electronic device 100 remains in the same state, i.e., when the foldable electronic device 100 is unfolded (or folded).

In step 1150, the processor 173a determines whether the change in temperature (the difference between t1 and t2) is greater than or equal to a predetermined value. For example, the processor 173a determines whether an absolute value of the difference between the first temperature and the second temperature (|t1-t2|) is greater than or equal to a predetermined value.

When the change in temperature is less than the predetermined value, the method returns to step 1130. For example, the processor 173a acquires the second temperature again.

When the processor 173a is to perform step 1130 again, the processor 173a may wait until a predetermined time elapses. For example, when acquiring the second temperature again, the processor 173a may acquire the second temperature via the temperature sensor after a predetermined time elapses. If the temperature is measured again too quickly, the obtained temperature value may not change significantly.

Additionally, the processor 173a may monitor when the foldable electronic device 100 is placed at the point where the temperature is low by measuring the temperature outside the foldable electronic device 100 at a predetermined time interval in the process of repeatedly performing operations 1130 and 1150.

The change in temperature may be greater than or equal to a predetermined when the temperature outside the foldable electronic device 100 is rapidly lowered. When the flexible display 110 is unfolded or folded and the plastic material (e.g., PI) constituting the flexible display 110 is hardened, a defective phenomenon (or a risk of deformation), such as buckling deformation, cracking, or peeling, may occur in the flexible display 110.

Accordingly, when the change in temperature is greater than or equal to the predetermined value in step 1150, the processor 173*a* drives a heat generation member connected to a heat diffusion member 210 for a set time in step 1190. The heat generation member is an electronic component serving as a main heat generation source, and may be, for example, a processor 173*a*, a PMIC, etc., mounted on the printed circuit boards 171 and 173. The set time may be a time set based on at least one of the first temperature, the second temperature, and the change amount of temperature. When the sudden temperature change of the flexible display 110 is controlled by driving the heat generation member for at least the set time, a defective phenomenon (or risk of deformation), such as buckling deformation, cracking, or peeling, may be prevented in the flexible display 110 when the foldable electronic device 100 is folded or unfolded.

Optionally, the processor 173*a* informs the user of a risk of deformation of the portion 101 in which the flexible display 110 is folded (the folding portion) due to a temperature change in step 1170, before performing operation 1190. For example, the processor 173*a* may inform the user of the risk of deformation of the folding portion 101 by adjusting the light emission color, the light emission time, the light emission period, etc., of the light-emitting devices disposed in the outer housings 191 and 193.

As another example, when the foldable electronic device 100 further includes the outer display 120 on the rear face of the outer housing 191 or 193, the processor 173*a* may inform the user of the risk of deformation of the folding portion 101 via the outer display 120. The processor 173*a* may inform the user of the risk of deformation of the folding portion 101 via the outer display 120 using a text or an image indicating the danger of deformation of the folding portion 101 to be displayed on the outer display 120. By causing the set time to be displayed on the outer display 120, the processor 173*a* may prompt the user to refrain from folding or unfolding the flexible display 110 before the set time elapses.

Alternatively, the processor 173*a* may perform step 1190 (and step 1170) when the second temperature becomes lower than the set temperature. For example, when the temperature outside the foldable electronic device 100 is lower than the set temperature, the processor 173*a* may drive the heat generation member to increase the temperature of the flexible display 110.

Figure 12:
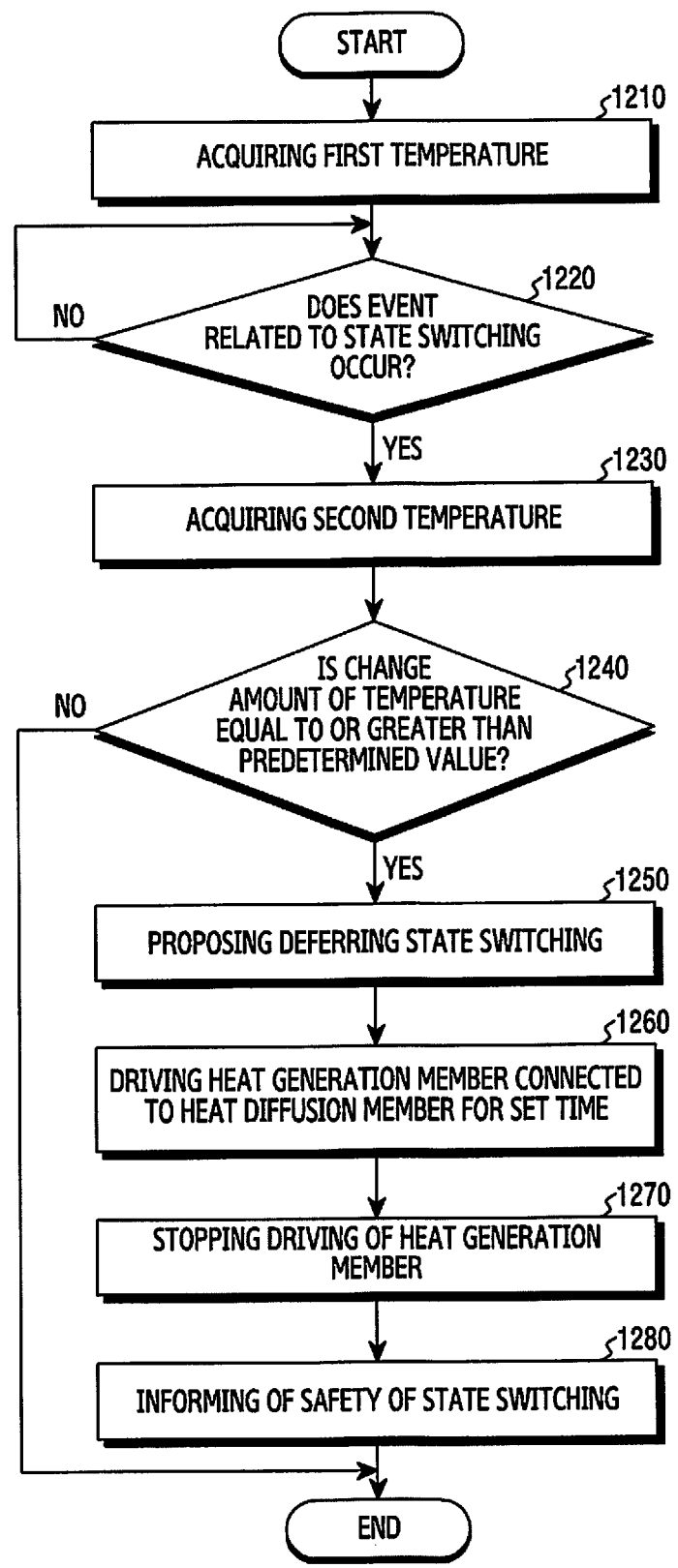
FIG. 12 illustrates a method for preventing deformation of a folding portion of a flexible display during an event related to switching of a state of a foldable electronic device according to an embodiment.

FIG. 12 illustrates a method for preventing deformation of a folding portion of a flexible display during an event related to switching a state of a foldable electronic device according to an embodiment. For example, the method of FIG. 12 will be described as being performed by the foldable electronic device 100 as illustrated in FIGS. 1 to 3.

Referring to FIG. 12, in step 1210, the processor 173*a* of the foldable electronic device 100 acquires a first temperature t1 via a temperature sensor that measures a temperature outside the foldable electronic device 100. The disposed position of the temperature sensor may be the same as that described with reference to FIG. 11.

In step 1220, the processor 173*a* determines whether an event related to state switching of the foldable electronic device 100 occurs. The event related to state switching may include an event for inducing the foldable electronic device 100 to be switched from the folded state into the unfolded state or an event for inducing the foldable electronic device 100 to be switched from the unfolded state to the folded state.

That is, when the event related to state switching occurs, there may be a high possibility that the user unfolds or folds the foldable electronic device 100. The event related to state switching may include a phone reception event, a message reception event, a mail reception event, a notification reception event, an alarm event, a grip event, etc. During the call reception event, the message reception event, the mail reception event, or the notification reception event, the user may unfold the foldable electronic device 100 to check the received contents. During the alarm event, the user may unfold the foldable electronic device 100 to check the time or to turn off the alarm. Because the grip event occurs when the user grips the foldable electronic device 100, there may be a high possibility that the user will unfold or fold the electronic device 100. For example, when the grip event occurs while the foldable electronic device 100 is folded, the processor 173*a* may determine that the user will unfold the foldable electronic device 100.

When the grip event occurs while the foldable electronic device 100 is unfolded, the processor 173*a* may determine a grip type (e.g., the number and positions of gripping fingers) by analyzing information regarding the grip event (e.g., number of touches and a touch position). When the grip type is for folding the foldable electronic device 100, the processor 173*a* may be determine that the user will fold the foldable electronic device 100.

When no event related to the state transition occurs, the processor 173*a* repeats step 1220 at predetermined time intervals. For example, the processor 173*a* may continuously monitor whether or not the event related to state switching occurs.

In step 1230, when the event related to state switching occurs, the processor 173*a* acquires a second temperature t2 via the temperature sensor. The first temperature may be a temperature measured while the foldable electronic device 100 is being folded, and the second temperature may be measured when the event related to the state switching occurs after the foldable electronic device 100 has been folded. Alternatively, the first temperature may be while the foldable electronic device 100 is being unfolded, and the second temperature may be measured when the event related to the state switching occurs after the foldable electronic device 100 is unfolded. As another example, the first temperature may be measured when the foldable electronic device 100 is already in the unfolded state (or the folded state), and the second temperature may be measured when the event related to state switching occurs in the same state, i.e., when the foldable electronic device 100 remains in the unfolded (or the folded state).

In step 1240, the processor 173*a* determines whether the change in temperature is greater than or equal to a predetermined value. For example, the processor 173*a* may determine whether an absolute value of the difference between the first temperature and the second temperature ($|t1-t2|$) is greater than or equal to a predetermined value.

When the change in temperature is less than the predetermined value, the processor 173*a* terminates the method. For example, when the change amount of temperature is less than the predetermined value, the temperature outside the foldable electronic device 100 has not suddenly lowered.

Thus, the processor 173a may terminate the process for preventing the deformation of the folding portion 101 of the flexible display 110.

However, when the change in temperature is greater than or equal to the predetermined value in step 1240, the processor 173a proposes that the user defers state switching of the foldable electronic device 100 in step 1250. For example, while the foldable electronic device 100 is folded, the processor 173a may propose that the user defers unfolding the foldable electronic device 100, and while the foldable electronic device 100 is unfolded, the processor 173a may propose that the user defers folding of the foldable electronic device 100. When the foldable electronic device 100 is unfolded or folded, deformation may occur in a portion 101 in which the flexible display 110 is folded (folding portion) due to a sudden temperature change. Thus, the processor 173a may propose that the user unfold or fold the foldable electronic device 100 at a later time.

For example, the processor 173a may propose that the user defers folding/unfolding the foldable electronic device 100 by adjusting the light emission color, the light emission time, the light emission period, etc., of the light-emitting devices disposed in the outer housings 191 and 193. As another example, when the foldable electronic device 100 further includes an outer display 120 on the rear face of the outer housing 191 or 193, the processor 173a may propose that the user defers folding/unfolding of the foldable electronic device 100 via the outer display 120, e.g., using a text and/or an image for proposing deferring state changing of the foldable electronic device to be displayed on the outer display 120.

The processor 173a may cause a set time for deferring state switching of the foldable electronic device 100 to be displayed on the outer display 120. For example, the processor 173a may instruct the user to refrain from switching the state of the foldable electronic device 100 during the set time. The set time may be set based on at least one of the first temperature, the second temperature, and the change amount of temperature.

In step 1260, the processor 173a drives the heat generation member connected to the heat diffusion member 210 for the set time. The heat generation member may be an electronic component that generates sufficient heat, e.g., a processor 173a, a PMIC, etc., mounted on the printed circuit boards 171 and 173. When the sudden temperature change of the flexible display 110 is controlled by driving the heat generation member connected to the heat diffusion member 210 for at least the set time, a defective phenomenon, such as buckling deformation, cracking, or peeling, may not occur in the flexible display 110 during the state switching of the foldable electronic device 100.

After the set time elapses, in step 1270, the processor 173a may stop driving the heat generation member.

In step 1280, the processor 173a informs the user that it is safe to fold/unfold the foldable electronic device 100. For example, the processor 173a may inform the user of the safety of state switching of the foldable electronic device 100 by stopping light emission of the light-emitting devices or by adjusting the light emission color, the light emission time, the light emission period, etc., of the light-emitting devices. As another example, when the foldable electronic device 100 further includes the outer display 120, the processor 173a may inform the user of the safety of state switching of the foldable electronic device 100 via the outer display 120, e.g., using a text and/or an image for informing of the safety of state changing of the foldable electronic device.

Alternative, the processor 173a may perform steps 1250 to 1280 when the second temperature becomes lower than the set temperature. For example, when the temperature outside the foldable electronic device 100 is lower than the set temperature, the processor 173a may drive the heat generation member to increase the temperature of the flexible display 110.

As described above, according to an embodiment, a foldable electronic device may include a flexible display; a hinge assembly configured to cause the flexible display to be in a first state in which a first area and a second area of the flexible display substantially flush with each other, or to be in a second state in which the first area and the second area face each other; and a heat diffusion member. The hinge assembly may include a first hinge frame attached to a bottom face of the first area via a first adhesive member; a second hinge frame attached to a bottom face of the second area via a second adhesive member; a hinge pivotally connecting the first hinge frame and the second hinge frame to each other; and a hinge housing having a space accommodating the hinge and connecting the first hinge frame and the second hinge frame to each other. At least a partial area of the heat diffusion member may be disposed between the flexible display and the hinge housing and is disposed in the space or at a position communicating with the space.

The heat diffusion member may include a first heat diffusion member and a second heat diffusion member. At least a partial area of the first heat diffusion member may be disposed between the second area and the hinge housing and is disposed in the space or at a position communicating with the space to be elongated above a central axis direction in which the first area and the second area adjoin each other, and at least a partial area of the second heat diffusion member may be disposed between the second area and the hinge housing and is disposed in the space or at a position communicating with the space to be elongated below the central axis direction.

The heat diffusion member may include a first heat diffusion member and a second heat diffusion member. At least a partial area of the first heat diffusion member may be disposed between the first area and the hinge housing and may be disposed in the space or at a position communicating with the space to be elongated in a central axis direction in which the first area and the second area adjoin each other, and at least a partial area of the second heat diffusion member may be disposed between the second area and the hinge housing and may be disposed in the space or at a position communicating with the space to be elongated in the central axis direction.

The heat diffusion member may be formed of a flexible material, and the partial area may be integrally disposed across a central axis where the first area and the second area adjoin each other.

The foldable electronic device may further include a heat dissipation sheet disposed between the first hinge frame and the second hinge frame and the flexible display, and attached to the rear face of the flexible display.

The foldable electronic device may further include a heat-conductive sheet disposed between the partial area and the flexible display.

The partial area may be disposed between the first hinge frame or the second hinge frame and the flexible display and may communicate with the space.

The partial area may be disposed in the space between the first hinge frame or the second hinge frame and the hinge housing and may be attached to the rear face of the first hinge frame or the second hinge frame.

The foldable electronic device may further include a heat-conductive sheet disposed between the first hinge frame or the second hinge frame, to which the partial area is attached, and the flexible display.

The first hinge frame or the second hinge frame, to which the partial area is attached, has a through hole formed in a portion, to which the partial area is attached, and the through hole is filled with a heat transfer material.

The first hinge frame or the second hinge frame, to which the partial area is attached, has a split portion formed in in a portion adjacent to a portion, to which the partial area is attached.

The first hinge frame has a first groove in a side portion thereof facing the second hinge frame, and a portion of the hinge is seated in and coupled to the first groove.

The second hinge frame has a second groove in a side portion thereof facing the first hinge frame, a remaining portion of the hinge may be seated in and coupled to the second groove, and the second hinge frame may have a third groove in the side portion thereof facing the first hinge frame such that a remaining portion of the heat diffusion member is inserted into the third groove.

The foldable electronic device may further include a first bracket having a first seating portion on which the first hinge frame is fixedly seated; and a second bracket having a second seating portion on which the second hinge frame is fixedly seated. The first seating portion may be formed by recessing the first bracket from a first face facing the first hinge frame towards a face facing the first face, and a recessed length, width, and height of the first seating portion correspond to a length, width, and height of the first hinge frame, respectively. The second seating portion may be formed by recessing the second bracket from a second face facing the second hinge frame towards a face facing the second face, and a recessed length, width, and height of the second seating portion correspond to a length, width, and height of the second hinge frame, respectively.

The foldable electronic device may further include a printed circuit board mounted with an electronic component serving as a heat source, and a remaining portion of the heat diffusion member may be disposed on or adjacent to the electronic component.

The foldable electronic device may further include a processor mounted on the printed circuit board, and a temperature sensor configured to be capable of measuring a temperature outside the foldable electronic device. The temperature sensor may be disposed on the rear face of the first hinge frame or the second hinge frame adjacent to the partial area within the space.

The processor may be configured to acquire a first temperature measured via the temperature sensor; acquire a second temperature measured via the temperature sensor when a predetermined time elapses after acquiring the first temperature; and drive the electronic component for a set time when it is determined that a change amount from the first temperature to the second temperature is equal to or greater than a predetermined value.

The processor may be configured to acquire a first temperature measured via the temperature sensor; determine whether or not an event related to state switching of the foldable electronic device occurs; acquire a second temperature measured via the temperature sensor when it is determined that the event related to state switching occurs; and drive the electronic component for a set time when it is determined that a change amount from the first temperature to the second temperature is equal to or greater than a predetermined value.

The event related to state switching may include at least one of a phone reception event, a message reception event, a mail reception event, a notification reception event, an alarm event, or a grip event.

The processor may be configured to propose that a user defers the state switching when it is determined that a change amount from the first temperature to the second temperature is equal to or greater than a predetermined value; stop driving of the electronic component when the set time elapses; and inform the user that the state switching is safe. The operation of proposing that the user defers the state switching may include adjusting at least one of a light emission color, a light emission time, or a light emission period of a light-emitting device disposed in the foldable electronic device; causing at least one of a text or an image for proposing that the user defers the state switching to be displayed on an outer display disposed in the foldable electronic device; or causing the set time to be displayed on the outer display. The operation of informing that the state switching is safe may include stopping light emission of the light-emitting device; adjusting at least one of the light emission color, the light emission time, or the light emission period of the light-emitting device; or causing at least one of a text or an image for informing that the state switching is safe to be displayed on the outer display.

Figure 13:
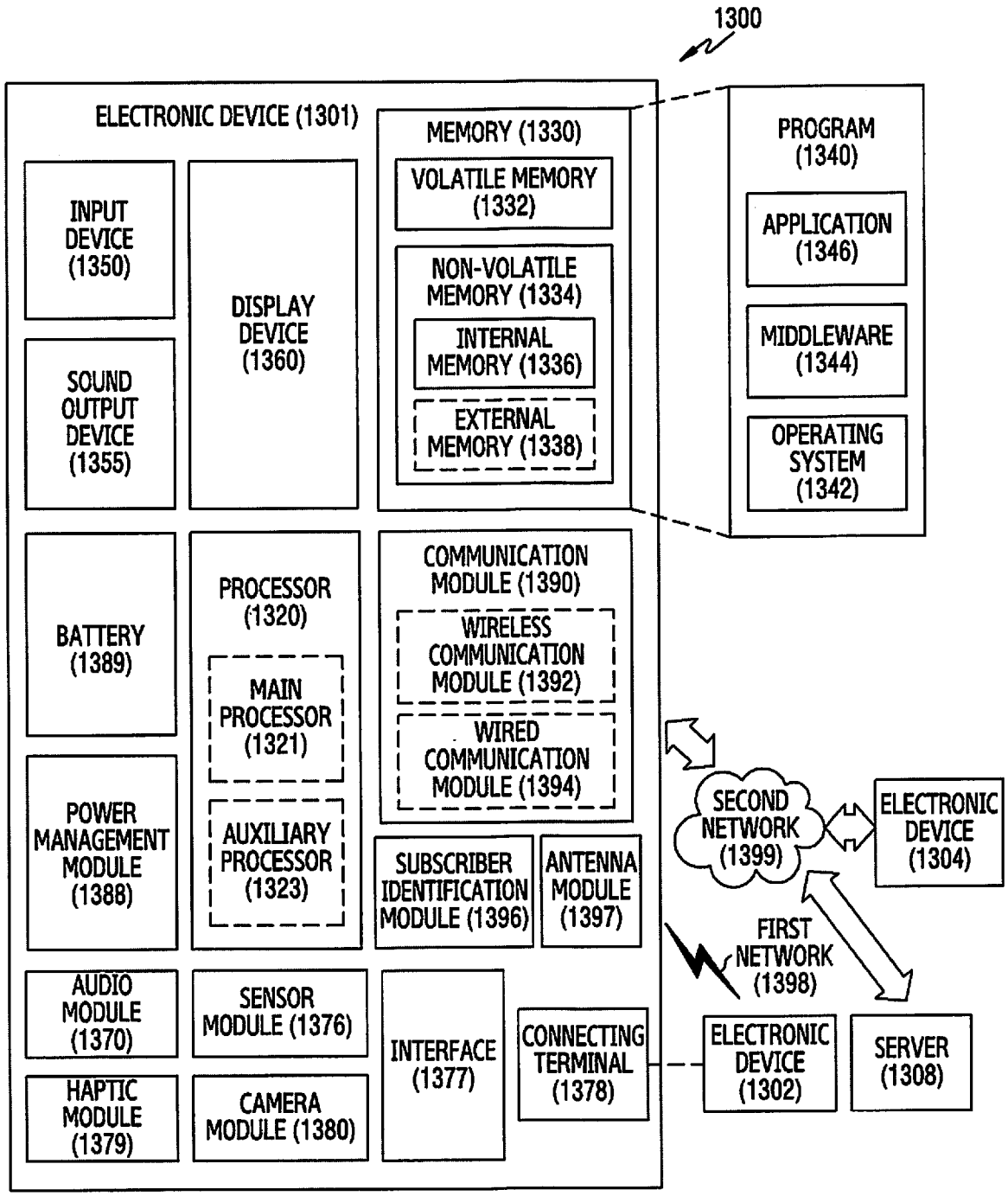
FIG. 13 illustrates an electronic device in a network environment according to an embodiment.

FIG. 13 illustrates an electronic device in a network environment according to an embodiment.

Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). The electronic device 1301 may communicate with the electronic device 1304 via the server 1308. The electronic device 1301 includes a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, and an antenna module 1397. Alternatively, at least one (e.g., the display device 1360 or the camera module 1380) of the components may be omitted from the electronic device 1301, or one or more other components may be added in the electronic device 1301.

Additionally, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute software (e.g., a program 1340) to control at least one other component (e.g., a hardware or software component) of the electronic device 1301 coupled with the processor 1320, and may perform various data processing or computation. As at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. The processor 1320 includes a main processor 1321 (e.g., a CPU, an AP), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). The auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include software (e.g., the program 1340) and input data or output data for a command related thereto. The memory 1330 includes the volatile memory 1332 and the non-volatile memory 1334.

The program 1340 may be stored in the memory 1330 as software, and includes, for example, an operating system (OS) 1342, middleware 1344, and an application 1346.

The input device 1350 may receive a command or data to be used by other component (e.g., the processor 1320) of the electronic device 1301, from the outside (e.g., a user) of the electronic device 1301. The input device 1350 may include a microphone, a mouse, a keyboard, or a digital pen (e.g., a stylus pen).

The sound output device 1355 may output sound signals to the outside of the electronic device 1301. The sound output device 1355 may include a speaker or a receiver. The speaker may be used for general purposes, such as playing multimedia or playing recordings, and the receiver may be used for an incoming calls. The receiver may be implemented as separate from, or as part of the speaker.

The display device 1360 may visually provide information to the outside (e.g., a user) of the electronic device 1301. The display device 1360 may include a display, a hologram device, or a projector and control circuitry to control a corresponding one of the display, hologram device, and projector. The display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. The audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. The sensor module 1376 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. The interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). The connecting terminal 1378 may include an HDMI connector, a USB connector, an SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include a motor, a piezoelectric element, or an electric stimulator.

The camera module 1380 may capture a still image or moving images. The camera module 1380 may include one or more lenses, image sensors, image signal processors, or flashes.

The power management module 1388 may manage power supplied to the electronic device 1301. The power management module 1388 may be implemented as at least part of a PMIC.

The battery 1389 may supply power to at least one component of the electronic device 1301. The battery 1389 may include a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. The communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, Wi-Fi direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. The antenna module 1397 may include an antenna including a radiating element composed of a conductive material or a conductive pattern formed in or on a substrate (e.g., a printed circuit board (PCB)). The antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. Another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. All or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic devices may include a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

According to an embodiment, heat generation can be controlled in the foldable electronic device using a heat dissipation structure utilizing an inner space of a hinge housing.

In addition, because a sudden temperature change of a flexible display is controlled via a heat dissipation structure, it is possible to improve space utilization in the foldable electronic device without requiring a separate temperature control structure.

In addition, because a sudden temperature change of the flexible display is controlled, it is possible to reduce the risk of deformation of the flexible display during the opening/closing the foldable electronic device.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A foldable electronic device, comprising:
    a flexible display;
    a hinge assembly configured to fold and unfold a first area and a second area of the flexible display toward and away from each other, respectively,
    wherein the hinge assembly includes:
    a first hinge frame disposed under at least one portion of the first area and supporting the first adhesive area;
    a second hinge frame disposed under at least one portion of the second area and supporting the second adhesive area;
    a first hinge pivotally connecting a first portion of the first hinge frame and a second portion of the second frame with each other; and
    a second hinge pivotally connecting a third portion of the first hinge frame and a fourth portion of the second frame with each other;
    a heat diffusion member configured to dissipate heat generated from an electronic component included in the foldable electronic device, at least one portion of the heat diffusion member overlapped with the first hinge when viewed in a direction from a first end of a folding axis of the hinge assembly to a second end of the folding axis of the hinge assembly;
    a first bracket including a first recessed seating portion on which the first hinge frame is fixedly seated, a recessed length, width, and height of the first recessed seating portion substantially corresponding to a length, width, and height of the first hinge frame, respectively; and
    a second bracket including a second recessed seating portion on which the second hinge frame is fixedly seated, a recessed length, width, and height of the second recessed seating portion substantially corresponding to a length, width, and height of the second hinge frame, respectively.

2. The foldable electronic device of claim 1,
    wherein the at least one portion of the heat diffusion member is overlapped with the second hinge when viewed in the direction from the first end to the second end.

3. The foldable electronic device of claim 1,
    wherein the first hinge and the second hinge are spaced apart from each other by a predetermined distance in the direction from the first end to the second end.

4. The foldable electronic device of claim 1,
    wherein the at least one portion of the heat diffusion member is disposed between the first hinge and the second hinge when viewed in a direction substantially perpendicular to the direction from the first end to the second end.

5. The foldable electronic device of claim 1, further comprising:
    a flexible printed circuit board connecting a first electronic component disposed in the first bracket and a second electronic component disposed in the second bracket,
    wherein the first hinge frame includes a first opening over which a first portion of the flexible printed circuit board is disposed when viewed in a direction substantially perpendicular to the flexible display, and
    wherein the second hinge frame includes a second opening over which a second portion of the flexible printed circuit board is disposed when viewed in the direction substantially perpendicular to the flexible display.

6. The foldable electronic device of claim 1,
    wherein the second hinge frame includes a groove over which at least one portion of the heat diffusion member is disposed when viewed in a direction substantially perpendicular to the flexible display.

7. The foldable electronic device of claim 6,
    wherein the at least one portion of heat diffusion member is disposed on or adjacent to the electronic component through the groove included in the second hinge frame.

8. The foldable electronic device of claim 1,
    wherein the heat diffusion member is formed of a flexible material.

9. The foldable electronic device of claim 1,
    wherein at least one portion of the first hinge frame and at least one portion of the second hinge frame are spaced apart from the first hinge when the flexible display is folded.

10. The foldable electronic device of claim 3,
    wherein the at least one portion of the first hinge frame and the at least one portion of the second hinge frame are spaced apart from the second hinge when the flexible display is folded.

11. The foldable electronic device of claim 1,
    wherein the heat diffusion member includes a first heat diffusion member and a second heat diffusion member.

12. The foldable electronic device of claim 11,
    wherein at least one portion of the first heat diffusion member is disposed between the first hinge frame and the flexible display, and
    wherein at least one portion of the second heat diffusion member is disposed between the second hinge frame and the flexible display.

13. The foldable electronic device of claim 11,
    wherein at least one portion of the first heat diffusion member is disposed over a first groove formed in the first hinge frame when viewed in a direction substantially perpendicular to the flexible display, and wherein at least one portion of the second heat diffusion member is disposed over a second groove formed in the second hinge frame when viewed in the direction substantially perpendicular to the flexible display.

14. The foldable electronic device of claim 13,
wherein the at least one portion of the first heat diffusion member is disposed on or adjacent to the electronic component through the first groove formed in the first hinge frame, and
wherein the at least one portion of the second heat diffusion member is disposed on or adjacent to the electronic component through the second groove formed in the second hinge frame.

15. The foldable electronic device of claim 13,
wherein the electronic component includes a first electronic component and a second electronic component,
wherein the at least one portion of the first heat diffusion member is disposed on or adjacent to the first electronic component through the first groove formed in the first hinge frame, and
wherein the at least one portion of the second heat diffusion member is disposed on or adjacent to the second electronic component through the second groove formed in the second hinge frame.

16. The foldable electronic device of claim 1, further comprising a hinge housing including a space, which accommodates the first hinge and the second hinge, and connecting the first hinge frame and the second hinge frame to each other.

17. The foldable electronic device of claim 16,
wherein at least one portion of the heat diffusion member is disposed in the space, between the first hinge frame or the second hinge frame and the hinge housing, and is attached to a rear surface of the first hinge frame or the second hinge frame.

18. The foldable electronic device of claim 17, further comprising a heat conductive sheet disposed between the first hinge frame or the second hinge frame, to which the at least one portion of the heat diffusion member is attached, and the flexible display.

19. The foldable electronic device of claim 1, further comprising a heat dissipation sheet disposed between the first hinge frame and the second hinge frame and the flexible display, and attached to a rear surface of the flexible display.

20. The foldable electronic device of claim 1, further comprising a heat conductive sheet disposed between at least one portion of the heat diffusion member and the flexible display.

* * * * *